W. D. BALLARD.
Horse Hay Fork.
No. 94,174. Patented Aug. 31, 1869.
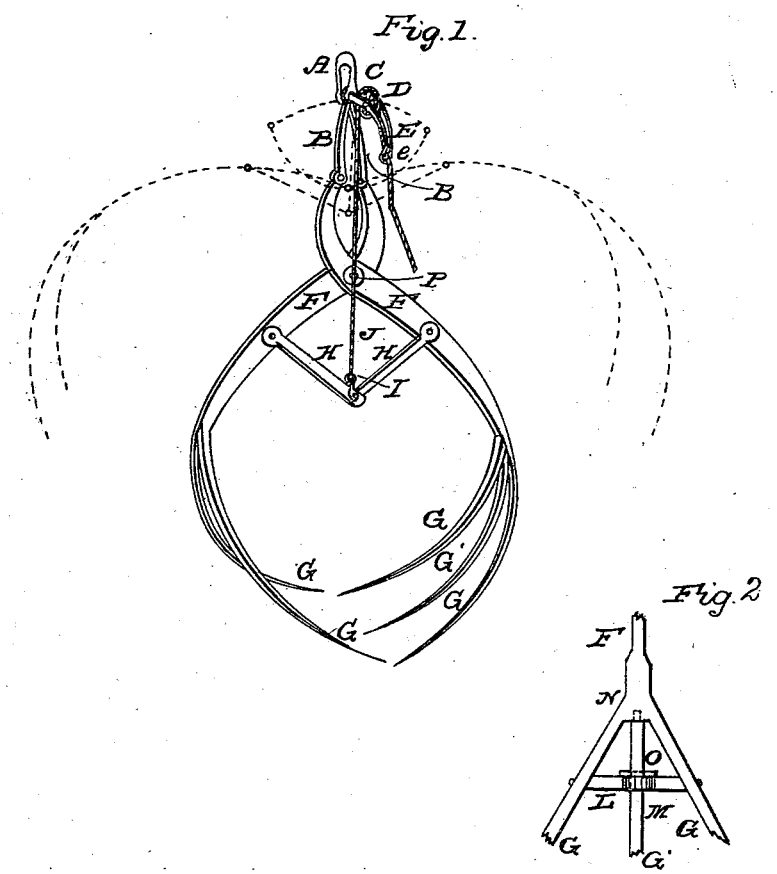

United States Patent Office.

WILLIAM D. BALLARD, OF DAVISBURG, MICHIGAN.

Letters Patent No. 94,174, dated August 31, 1869.

IMPROVEMENT IN HORSE HAY-FORKS.

The Schedule referred to in these Letters Patent and making part of the same.

*To whom it may concern:*

Be it known that I, WILLIAM D. BALLARD, of Davisburg, in the county of Oakland, and State of Michigan, have invented a new and useful Improvement in Horse Hay-Fork; and I do declare that the following is a true and accurate description thereof, reference being had to the accompanying drawngs, and to the letters of reference marked thereon, and being a part of this specification, in which—

Figure 1 is a perspective view of my fork closed, as when loaded.

Figure 2 shows the method of securing the intermediate movable tine.

Like letters refer to like parts in each figure.

The nature of this invention relates to an improved construction of horse hay-forks, and consists in the peculiar arrangement of a pair of levers for spreading apart the forks to discharge their load, operated by a tripping-line, and in the general arrangement of its parts, as hereinafter more fully shown and set forth.

In the drawings—

F represents the shanks of my improved forks, bifurcated to form the tines G.

The shanks are curved, as shown, and pivoted to each other at P.

B are links. One end of each is pivoted to the upper end of the shanks F, and the other ends of both are pivoted to the clevis A, to which the draught-rope is attached.

By means of the above-described arrangement, when an upward strain is exerted on the clevis A, the points of the forks will be caused to approach each other.

C is a forked bolt passing through the clevis A and links B, serving as their pivot.

In the jaws of its forks is hung a grooved pulley, D, carrying the tripping-line J.

E is a forked guide embracing the pulley D, its forked ends being pivoted on the shaft on which the pulley is secured, its free end terminating in an eye, e.

H are levers, whose inner ends are pivoted together and to the clevis I, while their outer ends are pivoted to the shanks of the forks, as shown.

These levers are of such length, that when brought to a horizontal line, they will spread open the forks to their fullest extent.

One end of the tripping-line J is secured to the clevis I, the other end is led up between the jaws of the bolt C, over the pulley D, down through the jaws of the guide E, thence through its eye, e, to the hand of the attendant, who, by pulling on it, spreads the forks apart, as shown in dotted lines in fig. 1, and releases their load.

When the fork is to be used in elevating short straw or other material which might fall through between the tines G, an intermediate tine, G', is inserted, in the following manner:

L is a brace between the outer tines G, fig. 2, and is provided with a slot, M, through which is passed the tine G', whose shank is inserted in a socket, N, in the bifurcation of the fork, where it is held in place by a key, O, driven through a slot in it, on the inner side of the brace.

When the implement is used for elevating hay, the tine G' may be removed.

It will be noticed that the bolt C rotates freely in its bearings in the links B and clevis A, so that the attendant can open the forks while standing at an angle thereto, the tripping-line passing over the pulley in a direct line from his hand.

The operation of this improved fork is so clearly shown in the drawing, that a further description thereof is unnecessary.

What I claim as my invention, and desire to secure by Letters Patent, is—

1. In horse hay-forks, the unloading-device herein described, consisting of the rotating forked bolt C, pulley D, forked guide E, provided with eye e, the levers H, clevis I, and tripping-line J, arranged and operating substantially as described.

2. The combination, of the forks F, pivoted to each other, as described the links B, and the clevis A, when constructed, arranged, and operating as and for the purpose set forth.

Witnesses:    WILLIAM D. BALLARD.
WM. E. FENWICK,
OSCAR PERCY.